United States Patent
Colliaux et al.

(10) Patent No.: US 11,523,324 B2
(45) Date of Patent: Dec. 6, 2022

(54) METHOD FOR CONFIGURING A WIRELESS COMMUNICATION COVERAGE EXTENSION SYSTEM AND A WIRELESS COMMUNICATION COVERAGE EXTENSION SYSTEM IMPLEMENTING SAID METHOD

(71) Applicant: SAGEMCOM BROADBAND SAS, Rueil-Malmaison (FR)

(72) Inventors: Mathieu Colliaux, Rueil-Malmaison (FR); Laurent Alarcon, Rueil-Malmaison (FR)

(73) Assignee: SAGEMCOM BROADBAND SAS, Saint-Malo (FR)

( * ) Notice: Subject to any disclaimer, the term of this patent is extended or adjusted under 35 U.S.C. 154(b) by 207 days.

(21) Appl. No.: 16/921,269

(22) Filed: Jul. 6, 2020

(65) Prior Publication Data
US 2021/0068032 A1 Mar. 4, 2021

(30) Foreign Application Priority Data
Aug. 29, 2019 (FR) ...................................... 1909510

(51) Int. Cl.
H04W 40/12 (2009.01)
H04L 45/74 (2022.01)
H04W 48/16 (2009.01)
H04L 61/5014 (2022.01)
H04W 88/16 (2009.01)

(52) U.S. Cl.
CPC ............ *H04W 40/12* (2013.01); *H04L 45/74* (2013.01); *H04L 61/5014* (2022.05); *H04W 48/16* (2013.01); *H04W 88/16* (2013.01)

(58) Field of Classification Search
None
See application file for complete search history.

(56) References Cited

U.S. PATENT DOCUMENTS

| | | | |
|---|---|---|---|
| 8,605,621 B2 | 12/2013 | Javaid et al. | |
| 2007/0197220 A1* | 8/2007 | Willey | H04W 48/10 455/435.1 |
| 2022/0150925 A1* | 5/2022 | Chao | H04W 72/042 |

FOREIGN PATENT DOCUMENTS

WO 2016/188567 A1 12/2016

* cited by examiner

*Primary Examiner* — Hong S Cho
(74) *Attorney, Agent, or Firm* — Oliff PLC

(57) ABSTRACT

A method for configuring a wireless communication coverage extension system is described. The latter comprises a backhaul subnetwork in tree form comprising a plurality of interconnected nodes. At least two nodes directly connected to an internet access gateway are identified among the nodes of the backhaul subnetwork. A single node is selected from the at least two identified nodes to be the node through which a configuration of the wireless communication coverage extension system is defined. The configuration of the wireless communication coverage extension system defined is then sent from the selected node to all the other nodes of the backhaul subnetwork.

14 Claims, 5 Drawing Sheets

METHOD FOR CONFIGURING A WIRELESS COMMUNICATION COVERAGE EXTENSION SYSTEM AND A WIRELESS COMMUNICATION COVERAGE EXTENSION SYSTEM IMPLEMENTING SAID METHOD

TECHNICAL FIELD

The present invention relates to a method for configuring a wireless communication coverage extension system and a wireless communication coverage extension system implementing said method.

PRIOR ART

In local area networks LAN, systems for extending wireless communication coverage may be used in order to increase the range of these local area networks LAN by coordinating a plurality of distributed access points AP. These various access points are integrated in communication nodes, simply referred to hereinafter as nodes, interconnected by means of a backhaul subnetwork and all making available the same wireless local area network WLAN. In the context of Wi-Fi (registered trade mark) technology, all these access points AP thus use the same SSID (Service Set Identifier) and the same password (also referred to as a security key). Thus the extension of wireless communication coverage is transparent for the devices connected to the wireless local area network WLAN.

The wireless communication coverage extension system is thus typically connected to the internet through an internet access gateway GW, for example by means of an Ethernet cable connecting a principal node of the wireless communication coverage extension system to the gateway GW. The wireless communication coverage extension system then serves as a relay between the gateway and each device connected by cable or wireless to the local area network LAN, and also serves as a relay between these various devices connected to the local area network LAN to enable them to communicate with each other. The nodes in the backhaul subnetwork are connected to one another by a structure in tree form, a node then being able to serve as a relay between two other nodes in the backhaul subnetwork. The nodes are thus interconnected by means of cable connections, for example of the Ethernet type, or by wireless connections, for example a Wi-Fi (registered trade mark) connection using an SSID identifier different from said local area network WLAN itself. The nodes in the backhaul network thus communicate with one another by means of logic links, for example IP communications or encrypted tunnels or communications in accordance with a proprietary communication protocol. These logic links are typically established by means of probe and discovery messages.

The nodes in the backhaul subnetwork are typically coordinated in a centralised manner, by a master node chosen from said nodes in the backhaul subnetwork. The master node may be designated by fixed configuration or dynamically by election. All the nodes in the backhaul subnetwork thus have knowledge of the master node and are capable of identifying it by means of its MAC (medium access control) address.

In the case of local area networks LAN at subscribers of an internet access provider, the master node is preferentially the node of the backhaul subnetwork that is closest to the internet access gateway GW. This makes it possible to specifically activate thereon functionalities, such as for example parental control functionalities, since the master node then has a strategic position of concentrating the data stream while being the node in the wireless communication coverage extension system closest to the internet access gateway GW.

In the particular case where a plurality of nodes are directly connected to the gateway GW, if no master node is designated, it is difficult to be able to reconfigure functionalities (e.g. a parental control functionality) implemented in the wireless communication coverage extension system. This is because it will then be necessary to reconfigure all the nodes in the network one by one, which is not optimal.

It is therefore desirable to overcome these drawbacks of the prior art.

DISCLOSURE OF THE INVENTION

One object of the present invention is to propose a method for configuring a wireless communication coverage extension system comprising a backhaul network in tree form, comprising a plurality of nodes implementing a functionality of access point of one and the same wireless communication network, the wireless communication coverage extension system being adapted to make it possible to connect devices to said nodes by means of the wireless communication network or by cable in order to form a local area network, at least two nodes in said plurality of nodes being connected directly to an internet access gateway, referred to as a gateway. The method comprises the following steps:

identifying said at least two nodes directly connected to said gateway among said nodes in the backhaul subnetwork;

selecting a single node among said at least two nodes identified in order to be the node through which a configuration of said wireless communication coverage extension system is defined; and sending the configuration of the wireless communication coverage extension system defined from the selected node to all the other nodes in the backhaul subnetwork.

In a particular embodiment, identifying said at least two nodes connected to said gateway among said nodes of the backhaul subnetwork comprises, for each node in the backhaul subnetwork:

broadcasting a request for locating at least one server available in order to obtain an IP address, said request comprising the MAC address of said node and a proprietary option;

receiving in return a response comprising an IP address for said node;

deducing therefrom that said node is directly connected to said gateway in the case where said response comprises said proprietary option with a predefined value and deducing therefrom that said node is not directly connected to said gateway otherwise.

In a particular embodiment, said server, said request and said response are in accordance with the DHCPv4 protocol or the DHCPv6 protocol.

In a particular embodiment, identifying said at least two nodes connected to said gateway among said nodes in the backhaul subnetwork comprises, for each node in the backhaul subnetwork:

sending an IP packet comprising in the header thereof data indicating the maximum number of routers that said packet can pass through, said data having the value 1;

deducing therefrom that said node is not directly connected to said gateway in the case where it receives in return a response indicating that the lifetime of said request has been exceeded and deducing therefrom that said node is directly connected to said gateway otherwise.

In a particular embodiment, identifying said at least two nodes connected to said gateway among said nodes in the backhaul subnetwork comprises, for each node in the backhaul subnetwork:
- sending in multicast mode a request for locating at least one router;
- receiving a response in return;
- deducing therefrom that said node is directly connected to said gateway in the case where said response comprises a proprietary option with a predefined value and deducing therefrom that said node is not directly connected to said gateway otherwise.

In a particular embodiment, said request and said response are in accordance with the neighbour discovery protocol of IPv6.

In a particular embodiment, selecting a single node among said at least two identified nodes comprises selecting the node belonging to a branch of said tree comprising the largest number of nodes.

In a particular embodiment, selecting the node belonging to a branch of said tree comprising the largest number of nodes comprises selecting the node having a higher serial number in the case where said at least two identified nodes belong to branches of said tree having the same number of nodes.

In a particular embodiment, selecting a single node among said at least two identified nodes comprises selecting the node a link of which with the gateway has a higher performance in terms of bandwidth, error rate and/or latency time.

In a particular embodiment, sending the configuration of the wireless communication coverage extension system from the selected node to all the other nodes in the backhaul subnetwork comprises sending a set of parameters allowing configuration of functionalities implemented by said nodes.

In a particular embodiment, said functionalities comprise functionalities of defining and sharing the configuration of the wireless communication coverage extension system, of DNS relays, of DHCP relays, of firewall and/or of parental control.

A wireless communication coverage extension system is also proposed, comprising a backhaul subnetwork in tree form comprising a plurality of nodes implementing a functionality of access point of one and the same wireless communication network, the wireless communication coverage extension system being adapted to make it possible to connect devices to said nodes by means of the wireless communication network or by cable in order to form a local area network, at least two nodes in said plurality of nodes being connected directly to an internet access gateway, referred to as a gateway. The system comprises:
- means for identifying said at least two nodes connected directly to said gateway among said nodes in the backhaul subnetwork;
- means for selecting a single node among said at least two nodes identified for being the node through which a configuration of said wireless communication coverage extension system is defined; and
- means for sending the configuration of the wireless communication coverage extension system defined from the selected node to all the other nodes in the backhaul subnetwork.

A node referred to as the node in question is also proposed, intended to be used in a wireless communication coverage extension system comprising a backhaul subnetwork in tree form comprising a plurality of nodes implementing a functionality of access point of one and the same wireless communication network including the node in question, the wireless communication coverage extension system being adapted to make it possible to connect devices to said nodes by means of the wireless communication network or by cable in order to form a local area network. The node in question comprises:
- means for identifying whether said node in question is directly or indirectly connected to said gateway;
- means for determining whether said node in question is selected from among said nodes in the backhaul subnetwork that are directly connected to the gateway in order to be the node through which a configuration of said wireless communication coverage extension system is defined,
- means for informing, via the backhaul subnetwork, whether the node in question is the node selected from among said nodes in the backhaul subnetwork in order to be the node through which the configuration of said wireless communication coverage extension system is defined; and
- means for sending the configuration of the wireless communication coverage extension system defined to all the other nodes in the backhaul subnetwork in the case where said node in question is the selected node.

A computer program is also proposed, characterised in that it comprises instructions for implementing the method according to one of the embodiments described above, when said program is executed by at least one processor.

Storage means are also proposed that store a computer program comprising instructions for implementing the method according to one of the embodiments described above, when said program is executed by at least one processor.

BRIEF DESCRIPTION OF THE DRAWINGS

The features of the invention mentioned above, as well as others, will emerge more clearly from the reading of the following description of an example embodiment, said description being made in relation to the accompanying drawings, among which.

DETAILED DISCLOSURE OF EMBODIMENTS

Figure 1:
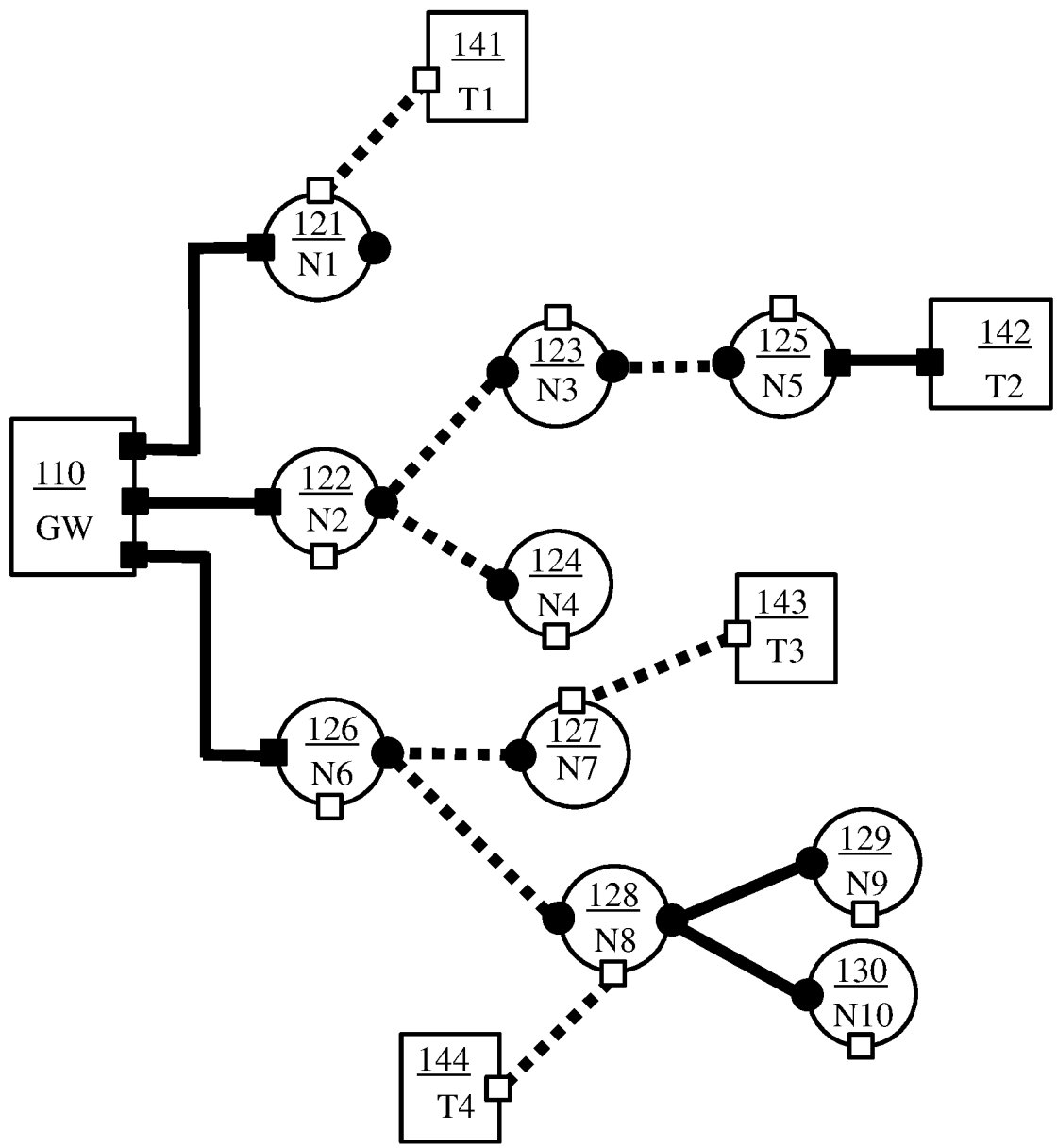
FIG. 1 illustrates schematically a communication system wherein the present invention can be implemented.

FIG. 1 illustrates schematically a communication system wherein the present invention can be implemented. The communication system comprises a wireless communication coverage extension system constructed around a backhaul subnetwork comprising a set of interconnected nodes N1 121, N2 122, N3 123, N4 124, N5 125, N6 126, N7 127, N8 128, N9 129 and N10 130. Each node in a plurality of nodes in the backhaul subnetwork, typically all the nodes in the backhaul subnetwork, implements a functionality of access point AP of a wireless local area network WLAN. The nodes in said plurality of nodes all make available the same wireless local area network WLAN (same name, etc.). In the context of Wi-Fi (registered trade mark) technology, all these access points AP thus use the same SSID identifier and the same password. The coverage area of the wireless local area network WLAN, and therefore in general of the local area network LAN thus formed around the wireless communication coverage extension system, is therefore extended in a way that is transparent for each terminal, or station, that connects thereto.

The nodes N1 121 to N10 130 of the backhaul subnetwork are connected to one another by means of a structure in tree form, a node then being able to serve as a relay between two other nodes in the backhaul subnetwork. The nodes N1 121 to N10 130 are thus interconnected by means of cable connections, for example of the Ethernet type, or by wireless connections, for example a Wi-Fi (registered trade mark) connection using an SSID identifier different from said wireless local area network WLAN itself. The nodes N1 121 to N10 130 of the backhaul subnetwork thus communicate with one another by means of logic links, for example IP communications or encrypted tunnels or communications in accordance with a proprietary communication protocol. However, when a cable interface is used for the backhaul subnetwork, this cable interface cannot be used for another purpose, in particular not to connect a terminal thereto.

By way of illustration, in FIG. 1, the nodes N1 121, N2 122 and N6 126 are connected directly to an internet access gateway GW 110. The branches of the coverage extension system connected to these nodes N1 121, N2 122 and N6 126 have a star or daisy chain topology. FIG. 1 also shows that the node N2 122 is connected to the node N3 123 and to the node N4 124 by means of a wireless connection (distinct from the wireless local area network WLAN itself) represented by a broken line, and the nodes N9 129 and N10 130 are connected to the node N8 128 by means of a cable connection depicted in a solid line. The node N5 125 is connected to the node N3 123 by means of a wireless connection. The node N6 126 is connected to the node N7 127 and to the node N8 128 by means of a wireless connection.

The wireless communication coverage extension system thus makes it possible to interconnect an internet access gateway GW 110, a terminal T1 141, a terminal T2 142, a terminal T3 143 and a terminal T4 144. The terminal T1 141 is for example a smartphone connected by a wireless connection to the node N1 121, that is to say the terminal T1 141 is thus connected via the wireless local area network WLAN by means of the node N1 121 acting as an access point AP. The terminal T2 142 is for example a television set connected by a cable connection to the node N5 125. The terminal T3 143 is for example a tablet connected by a wireless connection to the node N7 127, that is to say the terminal T3 143 is thus connected via the wireless local area network WLAN by means of the node N7 127 acting as an access point AP. The terminal T4 144 is for example an NAS (network attached storage) unit connected by a wireless connection to the node N8 128, that is to say the terminal T4 144 is thus connected via the wireless local area network WLAN by means of the node N8 128 acting as an access point AP.

The configuration of the wireless communication coverage extension system is defined through a principal master node chosen from said nodes in the backhaul subnetwork that are directly connected to the internet access gateway GW 110, namely one of the nodes N1 121, N2 122 or N6 126 in the context of FIG. 1. A particular embodiment of selection of the principal master node directly connected to the internet access gateway GW 110 is detailed below in relation to FIG. 7.

All the nodes in the backhaul subnetwork have knowledge of all the other nodes in the backhaul subnetwork and are capable of identifying them by means of the MAC addresses thereof and/or the network addresses (e.g. IP addresses) thereof.

Figure 2:
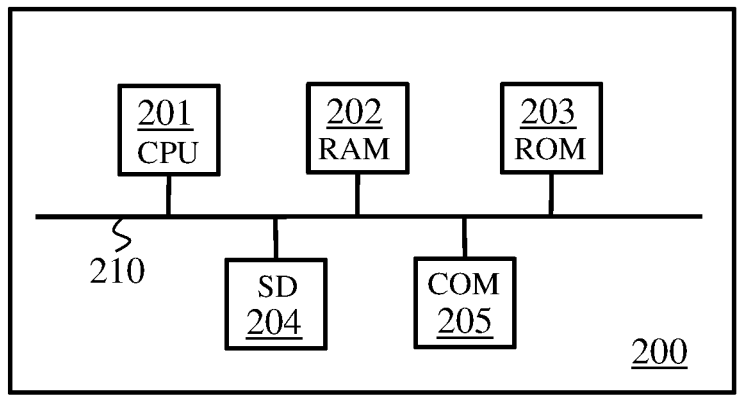
FIG. 2 illustrates schematically an example of hardware architecture of any node in a backhaul subnetwork according to one embodiment.

FIG. 2 illustrates schematically an example of hardware architecture of any node 200 in the backhaul subnetwork.

The example of hardware architecture presented comprises, connected by a communication bus 210: a processor CPU (central processing unit) 201; a random access memory RAM 202; a read only memory ROM 203 or a flash memory; a storage unit or a storage medium reader, such as an SD (Secure Digital) card reader 204 or a hard disk HDD (hard disk drive); and at least one set of communication interfaces COM 205. The set of communication interfaces COM 205 makes it possible to implement the functionality of access point AP in order to extend the coverage of the wireless local area network WLAN and enables the backhaul subnetwork to be established.

The processor CPU 201 is capable of executing instructions loaded in the RAM memory 202 from the ROM memory 203, from an external memory (such as an SD card), from a storage medium (such as the hard disk HDD), or from a communication network. On powering up, the processor CPU 201 is capable of reading instructions from the RAM memory 202 and executing them. These instructions form a computer program causing the implementation, by the processor CPU 201, of all or some of the algorithms and steps described below.

Thus all or some of the algorithms and steps described below can be implemented in software form by the execution of a set of instructions by a programmable machine, such as a DSP (digital signal processor) or a microcontroller or a processor. All or some of the algorithms and steps described below can also be implemented in hardware form by a machine or a dedicated component, such as an FPGA (field-programmable gate array) or an ASIC (application-specific integrated circuit). Thus the nodes N1 121 to N10 130 comprise electronic circuitry adapted and configured for implementing the methods and steps described below.

Figure 3:
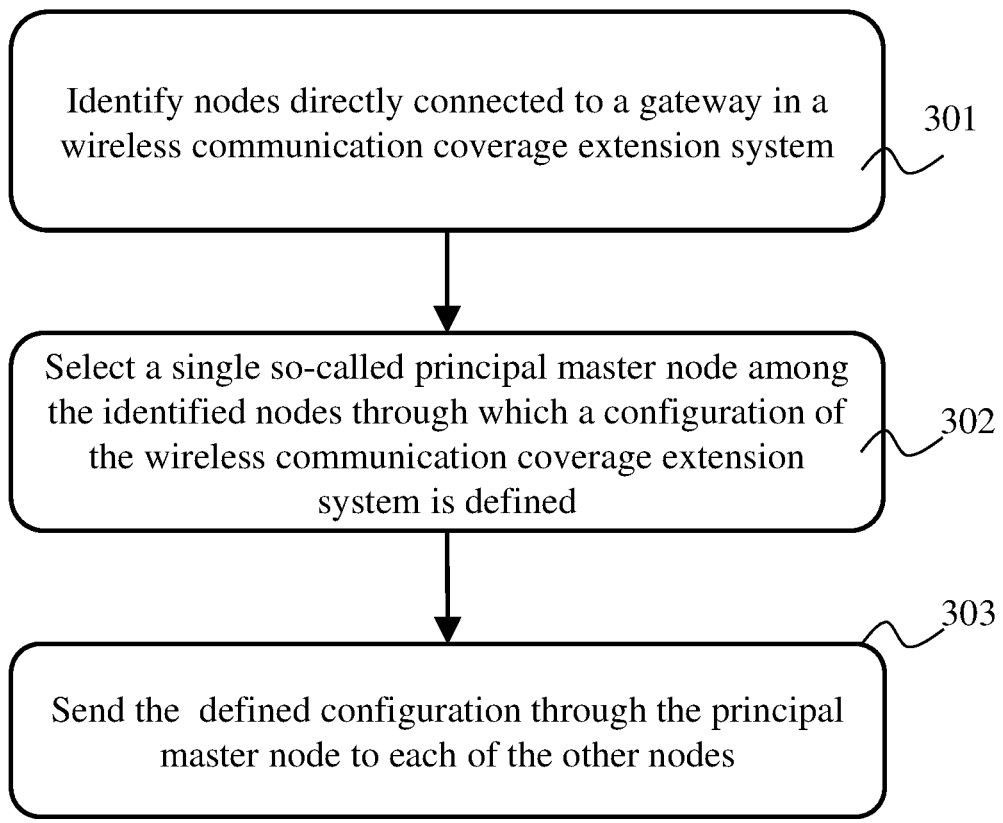
FIG. 3 illustrates schematically a method for configuring a wireless communication coverage extension system according to one embodiment.

FIG. 3 illustrates schematically a method for configuring a wireless communication coverage extension system according to one embodiment.

In a step 301, the nodes directly connected to the internet access gateway GW 110 are identified. To this end, one of the methods described below in relation to FIGS. 4A, 4B, 5A, B and 6 is implemented. In FIG. 1, the nodes identified in the step 301 are the nodes N1 121, N2 122 and N6 126. A particular role is attributed to them, namely a role of auxiliary master. This is because these nodes control the traffic in the branch that is associated with them. They can therefore implement certain specific functionalities, e.g. firewall or parental control.

Figure 7:
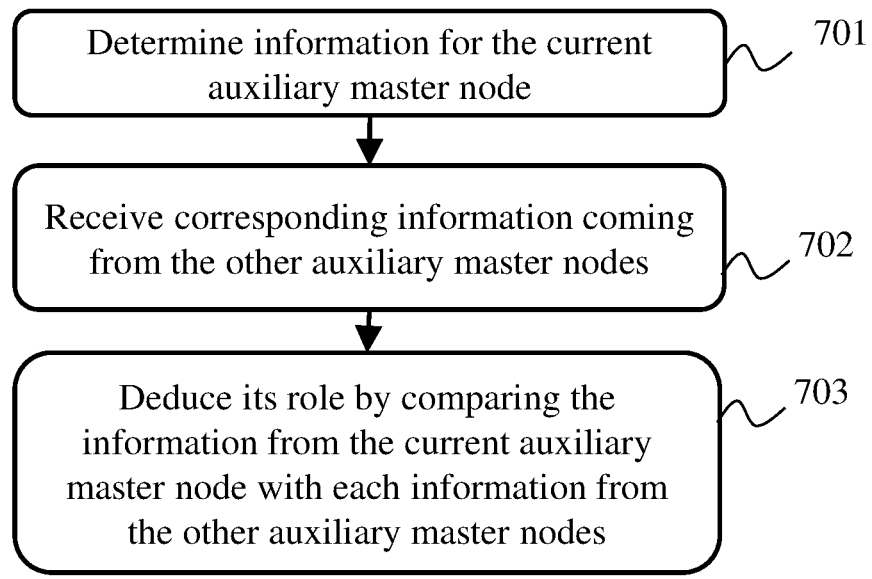
FIG. 7 illustrates schematically a method for selecting a principal master node of the backhaul subnetwork among the nodes identified as being directly connected to a gateway according to one embodiment.

In a step 302, a single node is selected among the nodes identified as being directly connected to the gateway in order to fulfil the role of principal master node. To this end, the method described below in relation to FIG. 7 is implemented. It is through this principal master node that the configuration of the wireless communication coverage extension system is defined. The node fulfilling the role of principal master is therefore selected from the nodes fulfilling the role of auxiliary master, which are directly connected to the gateway GW 110. The other nodes in the backhaul subnetwork that are neither principal master nor auxiliary master are called slave nodes.

Each node in the backhaul subnetwork is able to implement specific functionalities according in particular to its role (principal master, auxiliary master, slave) in the wireless communication coverage extension system. The functionalities implemented are functionalities of DNS (domain name system) relay, DHCP (dynamic host configuration protocol) relay, or firewall vis-à-vis data streams exchanged via the internet through the gateway GW 110, and/or functionalities of parental control vis-à-vis data streams exchanged by the internet through the gateway GW 110. A node implementing the DHCP relay functionality can relay broadcasts of requests for IP addresses of DHCP clients to a DHCP server. A node implementing the DNS relay functionality can relay requests for domain name resolution to a DNS server.

These functionalities can be implemented by all the nodes, whether they be principal master, auxiliary master or slave. However, a slave node may implement them optionally. Implementation of the parental control functionality by the slave nodes makes it possible to optimise the bandwidth. This is because the traffic can be controlled as close as possible to the physical connection so as not to consume bandwidth unnecessarily. For an auxiliary master node, only the DNS relay functionality is implemented optionally, the others being implemented obligatorily. A principal master node obligatorily implements all the functionalities. The node selected as principal master is furthermore able to implement specific functionalities of defining the configuration of the wireless communication coverage extension system, e.g. via a user interface, or sharing this configuration with the other nodes.

The various functionalities of filtering data streams exchanged via the internet through the gateway GW 110 (e.g. parental control or firewall) can be configured by a user according to his administration requirements. By way of simple illustrative example, the configuration can be done by means of a user interface such as a web page embedded in the principal master node or hosted on a remote server that is in relationship with the principal master node. In a variant, configuring the filtering functionalities can be done by means of a specific application executed by one of the terminals connected to the distributed Wi-Fi network, which controls the principal master node. The configuration comprises all the elements (e.g. rules and parameters) associated with a functionality and making it possible to implement same.

In a particular example embodiment, the configuration of the parental control is defined in the principal master node by a user and comprises for example the following rules: the prohibition made to equipment against accessing the data stream, blocking of certain websites, filtering of the packets received by a particular item of equipment that is identified by its MAC address, redirecting an external request to a local page, etc. The configuration also comprises the parameters associated with these rules, e.g. the URL (uniform resource locator) addresses of the websites to be blocked, the MAC address of the particular equipment, time ranges for use of equipment, time limits for use of equipment, etc.

In a step 303, the principal master node selected at the step 302 sends the configuration of the various functionalities to each of the auxiliary master nodes of the backhaul subnetwork. In a variant, the principal master node selected at the step 302 sends the configuration of the various functionalities to all the nodes (auxiliary masters and slaves) in the backhaul subnetwork.

In a particular embodiment, the principal master node selected at the step 302 sends the configuration of all the functionalities of the system (e.g. firewall, parental control) to all the nodes (auxiliary masters and slaves) of the backhaul subnetwork.

The transmission of a configuration by the principal master node can be done by means of a configuration synchronisation command. Such a command comprises a description of the configuration. By way of simple illustrative example, the command may comprise an indication of the addition of a parental control rule and of the parameters associated with the parental control rule. This command is then sent to the auxiliary master nodes and optionally to the slave nodes. On reception of the command, the auxiliary master nodes (and optionally the slave nodes) store in memory the configuration of the parental control functionality and apply the parental control with the configuration information stored.

A node uses solely the configuration corresponding to the functionalities that it implements. On the other hand, it has at all times access to the configuration of all the functionalities of the system, which is particularly advantageous in the case of a change of role. Thus an auxiliary master node becoming a principal master node will have knowledge of the configuration making it possible to implement functionalities that it did not implement previously, e.g. the configuration-sharing functionality. In one example embodiment, the user interface, e.g. the web page, used for the configuration is embedded on all the nodes. Thus the configuration can take place through this interface in a node that has newly become principal master node.

The adaptation of the traffic control rules (e.g. for filtering the data streams) to the situation of each branch, and therefore of each node, can be done by the principal master node from its possible knowledge of the whole of the topology of the backhaul subnetwork and by each of the auxiliary master nodes according to their own knowledge of the branch for which they are responsible.

Figure 4A:
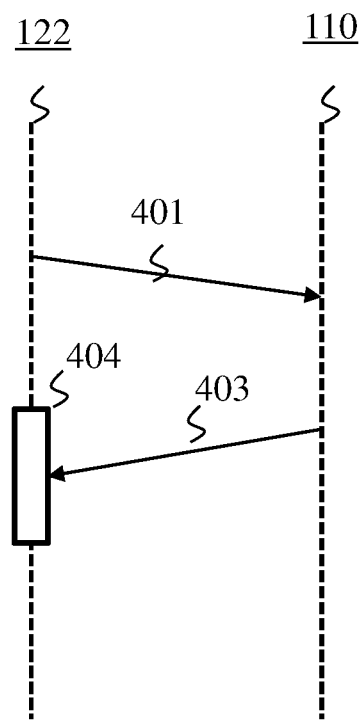
FIG. 4A illustrates schematically a method for identifying nodes directly connected to a gateway according to a particular embodiment.
Figure 4B:
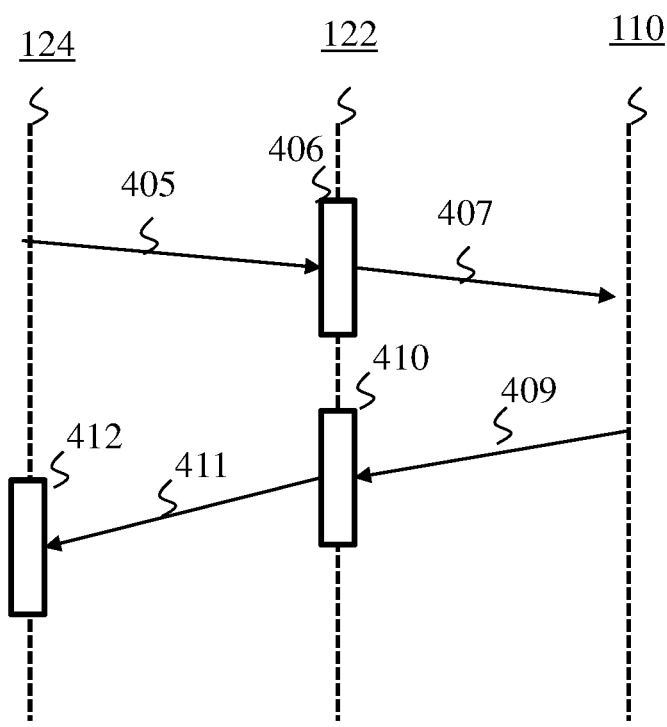
FIG. 4B illustrates schematically a method for identifying nodes directly connected to a gateway according to a particular embodiment.

FIGS. 4A and 4B illustrate schematically a method for identifying the nodes that are directly connected to the internet access gateway GW 110 according to a first embodiment that uses at least one proprietary option of the DHCPv4 protocol (DHCP is the English acronym for "dynamic host configuration protocol") defined by the normative document RFC 2131. The method described in relation to the DHCPv4 protocol applies in the same way to the DHCPv6 protocol. In general terms, this embodiment applies to any protocol using message exchanges of the DHCPDISCOVER and DHCPOFFER type.

FIGS. 4A and 4B describe the identification method for the branch comprising the nodes N2 and N4. The same method applies to the other nodes of the backhaul subnetwork. FIG. 4A describes the method in relation to the node N2 122 and FIG. 4B describes the method in relation to the node N4 124.

When it is brought into service, a node of the backhaul subnetwork must obtain a lease (allocation of IP address) supplied by a DHCP server as defined by the normative document RFC 1531, amended or supplemented by the normative documents RFC 1534, RFC 2131 and RFC 2132. The DHCP server is generally, but not necessarily, integrated in the gateway GW 110.

In a step 401, the node N2 122 broadcasts, when it is powered up, a request of the DHCPDISCOVER type on the backhaul subnetwork in order to locate a server of the DHCP type and to obtain an IP address. The request contains at least one proprietary option, e.g. situated in the range 224 to 254. The options situated in the range 224 to 254 are reserved for private use. Only the nodes of the backhaul subnetwork, and therefore not the gateway GW 110, are capable of interpreting this option and associating therewith a predefined value, e.g. 1234. In a particular embodiment, the request comprises an option 55, known by the term "parameter request list", containing the number of the proprietary option, e.g. 224. The request of the DHCPDISCOVER type also comprises the physical address (or MAC address) of the node N2 122. The node N2 122 being directly connected to the gateway GW 110, the latter receives the DHCPDISCOVER request.

In a step 403, the gateway GW 110, which is not capable of comprising the option, will therefore send a response of the DHCPOFFER type not having the option 224, or possibly possessing the option 224 but the value of which would not correspond to the predefined value, e.g. 1234. The response of the DHCPOFFER type comprises in particular the IP address of the DHCP server, as well as the IP address that it offers to the node.

During a step 404, the response of the DHCPOFFER type is received by the node N2 122, which analyses it. The node N2 122 deduces therefrom that it is directly connected to the gateway GW 110 because of the absence of the proprietary option 224 or because of the presence of this option 224 but with a value different from the predefined value. Once its IP address has been obtained, the node N2 122 can thus accept other devices, such as the node N4 124.

With reference to FIG. 4B, in a step 405, the node 124 N4 broadcasts, when it is powered up, a DHCPDISCOVER request on the backhaul subnetwork with at least one proprietary option, e.g. situated in the range 224 to 254. In a particular embodiment, the request comprises an option 55, known by the term "parameter request list", containing the number of the proprietary option, e.g. 224.

In a step 406, the node N2 122 intercepts the DHCPDISCOVER request and transmits it upstream on the backhaul subnetwork in a step 407. The DHCPDISCOVER request coming from the node N4 124 and transmitted by the node N2 122 is received by the gateway GW 110.

In a step 409, the gateway GW 110, which is not capable of comprising the option, will therefore send a response of the DHCPOFFER type not having the option 224, or possibly having the option 224 but the value of which does not correspond to the predefined value, e.g. 1234.

In a step 410, the node N2 122 intercepts the response of the DHCPOFFER type. It then supplements it with the option 224 with the predefined value, e.g. 1234. More generally, the node N2 122 supplements, by the option 224 with the predefined value, all the messages of the DHCPOFFER type received upstream of the gateway GW 110 before transmitting them downstream. The node N2 122 thus indicates that it is interposed between the gateway GW 110 and the rest of the backhaul subnetwork. In a variant, the node N2 122 can supplement the DHCPACK messages that are the responses to DHCPREQUEST requests by the option 224 with the predefined value.

In a step 411, the node N2 122 transmits, downstream on the backhaul subnetwork, the DHCPOFFER response in which the option 224 has the predefined value.

In a step 412, the node N4 124 receives a response of the DHCPOFFER type. Analysing the responses, the node N4 124 deduces therefrom that it is connected to the gateway through another node. This is because, in the contrary case, the response of the DHCPOFFER type would not contain the option 224 or would contain the option 224 with a value different from the predefined value. Once its IP address has been obtained, the node N4 124 is thus in service and can in its turn accept other devices.

Figure 5A:
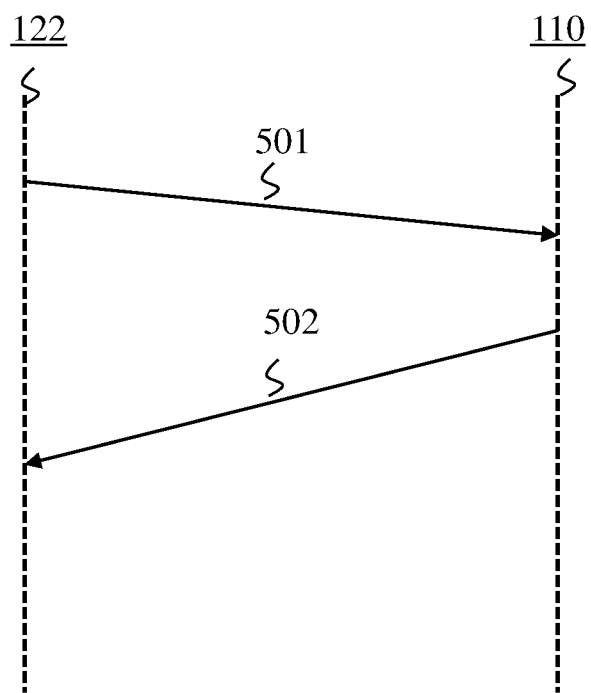
FIG. 5A illustrates schematically a method for identifying nodes directly connected to a gateway according to a particular embodiment.
Figure 5B:
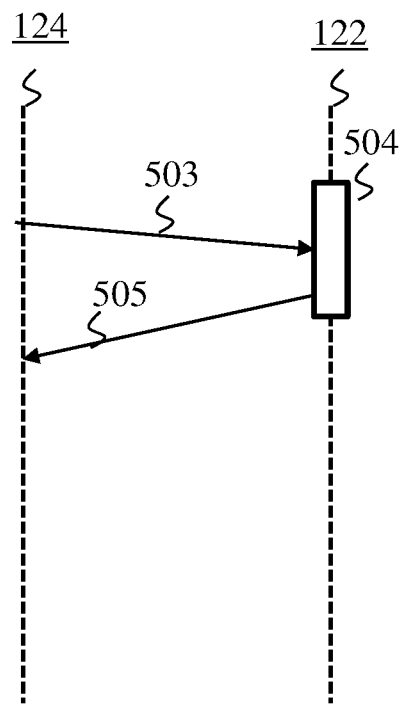
FIG. 5B illustrates schematically a method for identifying nodes directly connected to a gateway according to a particular embodiment.

FIGS. 5A and 5B illustrate schematically a method for identifying nodes that are directly connected to the internet access gateway GW 110 according to a second embodiment that uses TTL ("time to live") data placed in the header of the IP packets.

This data indicates the maximum number of items of active equipment through which the IP packet (transit routers) can pass in order to reach the equipment designated by its IP address. This mechanism is described in the documents RFC 792 and RFC 777. When a transit router arrives at the value 0 after having decremented this field, the packet is destroyed and a time-exceeded message, e.g. an ICMP time-exceeded message (ICMP is the acronym for "Internet Control Message Protocol") is sent to the source.

Each node of the backhaul subnetwork, on reception of an IP packet, decrements the TTL data before transmitting it to the next node in the backhaul subnetwork. Thus a node in the backhaul subnetwork, by sending an IP request to the gateway GW 110 with, in its header, a TTL value equal to 1, can identify the presence of nodes between itself and the gateway GW 110 and therefore determine whether or not it is directly connected to the gateway GW 110. If the node receives, in response to its request, a message of the echo response type, then the node is directly connected to the gateway GW 110, otherwise, i.e. if the node receives a time-exceeded message, the node is not directly connected to the gateway GW 110.

FIGS. 5A and 5B describe the identification method for the branch comprising the nodes N2 and N4 using a PING command. This command, which makes it possible to test the network, sends a message to a destination and requests it to retrieve it. The same method applies to the other nodes in the backhaul subnetwork.

FIG. 5A describes the method in relation to the node N2 122 and FIG. 5B describes the method in relation to the node N4 124.

With reference to FIG. 5A, in a step 501, the node N2 122 sends a message, e.g. a message of the ICMP ECHO type, comprising in its header a TTL value equal to 1 destined for the gateway GW 110 identified by its IP address. This message is directly received by the gateway GW 110.

In a step 502, the gateway GW 110 responds by sending a message of the echo reply type, e.g. a message of the ICMP ECHO REPLY type, intended for the node N2 122 identified by its IP address. The message received by the node N2 122 being a message of the echo reply type, the node N2 122 deduces from this that it is directly connected to the gateway GW 110.

With reference to FIG. 5B, in step 503, the node N4 124 sends, to the gateway GW 110, a message, e.g. a message of the ICMP ECHO type, comprising in its header a TTL value equal to 1. The gateway GW 110 is identified by its IP address.

In a step 504, the message of the ICMP ECHO type is received by the node N2 122, which decrements the TTL value. The TTL value is then equal to 0. The message of the ICMP ECHO type is therefore destroyed by the node N2 122.

In a step 502, the node N2 122 sends a time-exceeded message, e.g. a message of the ICMP time-exceeded type, to the node N4 124 identified by its IP address. The message received by the node N2 122 being a time-exceeded message, the node N4 124 deduces from this that it is not directly connected to the gateway GW 110.

Figure 6:
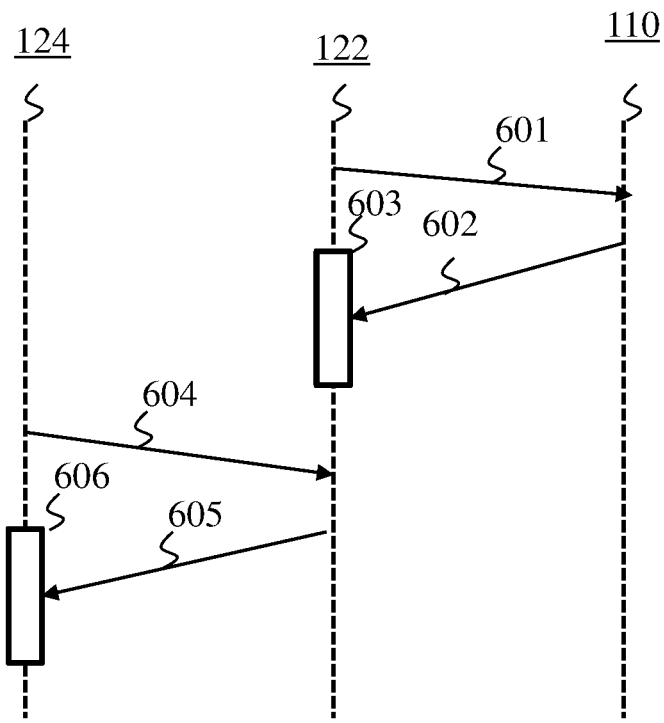
FIG. 6 illustrates schematically a method for identifying nodes directly connected to a gateway according to a third embodiment.

FIG. 6 illustrates schematically a method for identifying nodes that are directly connected to the internet access gateway GW 110 according to a third embodiment that implements at least one proprietary option of the ICMPv6 protocol defined by the normative document RFC 4861. This document describes in particular messages and an NDP (the acronym for "Neighbour Discovery protocol") for determining relationships between neighbouring nodes. As with the method described with reference to FIGS. 4A and 4B, this embodiment uses a proprietary option of the ICMPv6 protocol, a parameter of which comprises a predefined value, e.g. the value 1234. In general terms, this embodiment applies to any protocol implementing message exchanges of the ROUTER SOLICITATION and ROUTER ADVERTISEMENT type.

FIG. 6 describes the identification method for the branch comprising the nodes N2 and N4. The same method applies to the other nodes of the backhaul subnetwork.

In a step 601, the node N2 122 sends in multicast mode, over the backhaul subnetwork, a request of the ROUTER SOLICITATION type. The request is received by the gateway GW 110.

In a step 602, the gateway GW 110 responds by sending a response of the ROUTER ADVERTISEMENT type not having the option 224, or possibly having the option 224 but the value of which would not correspond to the predefined value, e.g. 1234.

In a step 603, the response of the ROUTER ADVERTISEMENT type is received by the node N2 122, which analyses it. The node N2 122 deduces therefrom that it is directly connected to the gateway because of the absence of the proprietary option 224 or because of the presence of this option 224 but with a value different from the predefined value.

In a step 604, the node N4 124 sends in multicast mode, over the backhaul subnetwork, a ROUTER SOLICITATION request. The request is received by the node N2 122.

In a step 605, the node N2 122 responds by sending a response of the ROUTER ADVERTISEMENT type comprising the option 224 with the predefined value, e.g. 1234.

In a step 606, the response of the ROUTER ADVERTISEMENT type is received by the node N4 124, which analyses it. The node N4 124 deduces from this that it is not directly connected to the gateway GW 110 because of the presence of the proprietary option 224 with the predefined value. This is because the node N4 124 is connected to the gateway GW 110 through the node N2 122.

FIG. 7 illustrates schematically a method for selecting a principal master node of the backhaul subnetwork among the nodes identified by the method illustrated by FIGS. 4A, 4B, 5A, 5B and 6. The method illustrated by FIG. 7 is implemented by each of the auxiliary master nodes. The method is described for an auxiliary master node referred to as the current auxiliary master node.

The function of the auxiliary master nodes that are directly connected to the gateway GW 110 is to control the traffic in the backhaul subnetwork. Among these auxiliary master nodes, one is selected as principal master node through which the configuration of the wireless communication coverage extension system is defined.

In a step 701, the current auxiliary master node determines at least one parameter characterising it. For example, the current auxiliary master node determines the number of nodes present in its branch. If the current auxiliary master node is the node N2 122, then, in the step 701, it determines the presence of four nodes in its branch (including itself). The current auxiliary master node transmits this parameter to the other auxiliary master nodes. In a step 702, the current auxiliary master node receives corresponding parameters, i.e. of the same nature, coming from each of the other auxiliary master nodes. For example, the node N2 122 receives the information from the node N1 121 that its branch contains only one node. It receives the information from the node N6 126 that its branch contains five nodes. The nodes exchange this information by means of logic links, for example IP communications or encrypted tunnels or communications in accordance with a proprietary communication protocol. In a variant, the auxiliary master nodes periodically send broadcast frames for communicating to all the other auxiliary master nodes the information characterising them. Thus the current auxiliary master node can continuously listen out for the announcements made by all the other auxiliary master nodes and thus know the number and characteristics thereof, e.g. the current role thereof (principal master, auxiliary master or slave), the performance of their link with the gateway, the number of nodes in their branch, etc.

In a step 703, the current auxiliary master node deduces its role therefrom by comparing its parameter, e.g. the number of nodes in its branch or the performance of its link with the gateway GW 110, with the parameters received from the other auxiliary master nodes. For example, if the current auxiliary master node is the node N2 122, then it deduces therefrom that its role is a role of auxiliary master since it is informed that the node N6 126 is the node the branch of which contains the largest number of nodes. If the current auxiliary master node is the node N6 126, then it deduces therefrom that its role is a role of principal master since it is informed that it belongs to the branch containing the largest number of nodes. The node N6 126 is therefore elected principal master node. By attributing the role of principal master to the node directly connected to the gateway GW 110 and belonging to the branch having the largest number of nodes, the traffic necessary for sending a functionality configuration is minimised. For example, in the case of FIG. 1 with the node N6 126 as the principal master node, fifteen jumps are necessary in order to join all the other nodes of the backhaul subnetwork. If the node N1 121 is elected principal master node, nineteen jumps are necessary for joining all the other nodes of the backhaul subnetwork. If the node N2 122 is elected principal master node, sixteen jumps are necessary for joining all the other nodes of the backhaul subnetwork.

The method illustrated by FIG. 7 being implemented by each of the auxiliary master nodes that have knowledge of the characteristics of the other auxiliary master nodes, they all come to the same conclusion as to their roles. If there already exists a principal master node, this also implements the method since its role may be called into question in particular in the case of modification of the topology of the backhaul subnetwork, e.g. by adding a new node.

In the case where two nodes directly connected to the gateway GW 110 belong to branches comprising the same number of nodes, a second criterion is defined to make it possible to select a principal master node. For example, the node having the highest serial number is selected. In a variant, the node having the lowest serial number is selected.

Various parameters characterising the nodes can be taken into account for selecting the principal master node, such as for example:
the number of nodes in their branch;
the performance of their link with the gateway in terms of bandwidth, error rate and/or latency time;
the total operating time of the node as principal master;
a combination, e.g. a linear combination, of one or more of these parameters.

If no principal master node is initially present, a newly connected node may become principal master node directly provided that it is directly connected to the gateway.

If a node changes role, it informs the other nodes of the backhaul subnetwork thereof. A negotiation may thus occur with the node that was up until then the principal master node. Rules may be defined such as for example never replacing an existing principal master node or replacing the existing principal master node with another node if this other node has already had this role of principal master longer than the existing principal master node or replacing the existing principal master node with another node if this other node has a link with the gateway GW 110 that has higher performance (e.g. the performance being measured in terms of bandwidth, error rate, latency time, etc.) than the existing principal master node.

The selection of the principal master can be initiated at any time by the sending of a message over a communication bus by any node, for example because the criteria that led to the current choice have changed because for example of a change in topology of the backhaul subnetwork (e.g. adding or eliminating a node, more generally a device, in the local area network LAN). In the case of our example, a change in topology in fact calls into question the calculations of jumps by the equipment and makes the current principal master node potentially unsuitable.

The invention claimed is:

1. A method for configuring a wireless communication coverage extension system comprising a backhaul network in tree form, comprising a plurality of nodes implementing a functionality of access point of one and the same wireless communication network, the wireless communication coverage extension system being adapted to make it possible to connect devices to said nodes by means of the wireless communication network or by cable in order to form a local area network, at least two nodes in said plurality of nodes being connected directly to an internet access gateway, referred to as a gateway, the method comprising the following steps:
identifying said at least two nodes directly connected to said gateway (110) among said nodes in the backhaul subnetwork;
selecting a single node among said at least two nodes identified in order to be the node through which a configuration of said wireless communication coverage extension system is defined by comparing a parameter associated with one of the at least two nodes to a corresponding parameter associated with another node of said at least two nodes, said parameter for a given node being: a number of nodes in a branch of said tree to which said given node belongs, a performance parameter in terms of bandwidth, error rate and/or latency time of a link between said given node and said gateway, an operating time of the given node as the node through which a configuration of said wireless communication coverage extension system is defined, or a combination of at least two of said parameters; and
sending the configuration of the wireless communication coverage extension system defined from the selected node to all the other nodes in the backhaul subnetwork.

2. The method according to claim 1, wherein identifying said at least two nodes connected to said gateway among said nodes of the backhaul subnetwork comprises, for each node in the backhaul subnetwork:
broadcasting a request for locating at least one server available in order to obtain an IP address, said request comprising the MAC address of said node and a proprietary option;
receiving in return a response comprising an IP address for said node;
deducing therefrom that said node is directly connected to said gateway in the case where said response comprises said proprietary option with a predefined value and deducing therefrom that said node is not directly connected to said gateway otherwise.

3. The method according to claim 2, wherein said server, said request and said response are in accordance with the DHCPv4 protocol or the DHCPv6 protocol.

4. The method according to claim 1, wherein identifying said at least two nodes connected to said gateway among said nodes in the backhaul subnetwork comprises, for each node in the backhaul subnetwork:
sending an IP packet comprising in the header thereof data indicating the maximum number of routers that said packet can pass through, said data having the value 1;
deducing therefrom that said node is not directly connected to said gateway in the case where it receives in return a response indicating that the lifetime of said request has been exceeded and deducing therefrom that said node is directly connected to said gateway otherwise.

5. The method according to claim 1, wherein identifying said at least two nodes connected to said gateway among said nodes in the backhaul subnetwork comprises, for each node in the backhaul subnetwork:
sending in multicast mode a request for locating at least one router;
receiving a response in return;
deducing therefrom that said node is directly connected to said gateway in the case where said response comprises a proprietary option with a predefined value and deducing therefrom that said node is not directly connected to said gateway otherwise.

6. The method according to claim 5, wherein said request and said response are in accordance with the neighbour discovery protocol of IPv6.

7. The method according to claim 1, wherein selecting a single node among said at least two identified nodes comprises selecting the node belonging to a branch of said tree comprising the largest number of nodes.

8. The method according to claim 7, wherein selecting the node belonging to a branch of said tree comprising the largest number of nodes comprises selecting the node having a higher serial number in the case where said at least two identified nodes belong to branches of said tree having the same number of nodes.

9. The method according to claim 1, wherein selecting a single node among said at least two identified nodes comprises selecting the node a link of which with the gateway has a higher performance in terms of bandwidth, error rate and/or latency time.

10. The method according to claim 1, wherein sending the configuration of the wireless communication coverage extension system from the selected node to all the other nodes in the backhaul subnetwork comprises sending a set of parameters allowing configuration of functionalities implemented by said nodes.

11. The method according to claim 10, wherein said functionalities comprise functionalities of defining and sharing the configuration of the wireless communication coverage extension system, of DNS relays, of DHCP relays, of firewall and/or of parental control.

12. A wireless communication coverage extension system, comprising a backhaul subnetwork in tree form comprising a plurality of nodes implementing a functionality of access point of one and the same wireless communication network, the wireless communication coverage extension system being adapted to make it possible to connect devices to said nodes by means of the wireless communication network or by cable in order to form a local area network, at least two nodes in said plurality of nodes being connected directly to an internet access gateway, referred to as a gateway, the system comprising electronic circuitry configured to:
  identify said at least two nodes connected directly to said gateway among said nodes in the backhaul subnetwork;
  select a single node among said at least two nodes identified for being the node through which a configuration of said wireless communication coverage extension system is defined by comparing a parameter associated with one of the at least two nodes to a corresponding parameter associated with another node of said at least two nodes, said parameter for a given node being: a number of nodes in a branch of said tree to which said given node belongs, a performance parameter in terms of bandwidth, error rate and/or latency time of a link between said given node and said gateway, an operating time of the given node as the node through which a configuration of said wireless communication coverage extension system is defined, or a combination of at least two of said parameters; and
  send the configuration of the wireless communication coverage extension system defined from the selected node to all the other nodes in the backhaul subnetwork.

13. A node, referred to as the node in question, intended to be used in a wireless communication coverage extension system comprising a backhaul subnetwork in tree form comprising a plurality of nodes implementing a functionality of access point of one and the same wireless communication network including the node in question, the wireless communication coverage extension system being adapted to make it possible to connect devices to said nodes by means of the wireless communication network or by cable in order to form a local area network, the node in question comprising electronic circuitry configured to:
  identify whether said node in question is directly or indirectly connected to said gateway;
  determine whether said node in question is selected from among said nodes in the backhaul subnetwork that are directly connected to the gateway in order to be the node through which a configuration of said wireless communication coverage extension system is defined, said selection being achieved by comparing a parameter associated with one of the at least two nodes to a corresponding parameter associated with another node of said at least two nodes, said parameter for a given node being: a number of nodes in a branch of said tree to which said given node belongs, a performance parameter in terms of bandwidth, error rate and/or latency time of a link between said given node and said gateway, an operating time of the given node as the node through which a configuration of said wireless communication coverage extension system is defined, or a combination of at least two of said parameters,
  inform, via the backhaul subnetwork, whether the node in question is the node selected from among said nodes in the backhaul subnetwork in order to be the node through which the configuration of said wireless communication coverage extension system is defined; and
  send the configuration of the wireless communication coverage extension system defined to all the other nodes in the backhaul subnetwork in the case where said node in question is the selected node.

14. A non-transitory storage medium storing a computer program comprising instructions for implementing the method according to claim 1 when said program is executed by at least one processor.

* * * * *